US012528551B2

(12) United States Patent
Sauvageau et al.

(10) Patent No.: US 12,528,551 B2
(45) Date of Patent: Jan. 20, 2026

(54) TRACK SYSTEM

(71) Applicant: SOUCY INTERNATIONAL INC., Drummondville (CA)

(72) Inventors: Yves Sauvageau, Drummondville (CA); Branislav Nanac, Drummondville (CA); Pierre-Yves Pepin, Drummondville (CA); Charles St-Arnaud, Trois-Rivieres (CA); Styve Allie, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 18/732,901

(22) Filed: Jun. 4, 2024

(65) Prior Publication Data

US 2024/0317335 A1 Sep. 26, 2024

Related U.S. Application Data

(62) Division of application No. 16/975,764, filed as application No. PCT/IB2019/051531 on Feb. 26, 2019, now Pat. No. 12,037,063.

(60) Provisional application No. 62/635,144, filed on Feb. 26, 2018.

(51) Int. Cl.
| | |
|---|---|
| *B62D 55/084* | (2006.01) |
| *B62D 55/10* | (2006.01) |
| *B62D 55/125* | (2006.01) |
| *B62D 55/14* | (2006.01) |
| *B62D 55/32* | (2006.01) |

(52) U.S. Cl.
CPC ........... *B62D 55/084* (2013.01); *B62D 55/10* (2013.01); *B62D 55/125* (2013.01); *B62D 55/32* (2013.01); *B62D 55/14* (2013.01)

(58) Field of Classification Search
CPC ...... B62D 55/084; B62D 55/10; B62D 55/14; B62D 55/32; B62D 55/104; B62D 55/125
USPC .......................................................... 301/195
See application file for complete search history.

(56) References Cited

U.S. PATENT DOCUMENTS

| | | |
|---|---|---|
| 3,653,274 A | 4/1972 | Greenwood |
| 4,405,026 A | 9/1983 | Merrifield |
| 4,834,478 A | 5/1989 | Stevens et al. |
| 5,127,714 A | 7/1992 | Satzler |

(Continued)

FOREIGN PATENT DOCUMENTS

WO WO-2017139356 A2 * 8/2017 ............. B62D 21/14

*Primary Examiner* — S. Joseph Morano
*Assistant Examiner* — Eva L Comino
(74) *Attorney, Agent, or Firm* — BCF LLP

(57) ABSTRACT

A track system includes a primary wheel structured to be rotationally attachable to a vehicle, a frame rotationally supporting a plurality of secondary wheels; a sub-frame supported by the frame. The sub-frame rotationally supports the primary wheel. The primary wheel and the plurality of secondary wheels support an endless track thereabout. A fastener secures the frame to the sub-frame and prevents pivoting of the frame relative to the sub-frame about the pivot axis. The fastener is disengageable. The frame is pivotable relative to the sub-frame about the pivot axis when the fastener is disengaged. The fastener is re-engageable to secure the frame to the sub-frame in any one of a plurality of different adjustment positions. In some implementations, a pivot member extends in a vertical direction between the sub-frame and the frame and defines a pivot axis of the frame.

19 Claims, 12 Drawing Sheets

(56) References Cited

U.S. PATENT DOCUMENTS

| | | | |
|---|---|---|---|
| 5,279,377 A | 1/1994 | Oertley | |
| 5,293,948 A | 3/1994 | Crabb | |
| 5,639,148 A | 6/1997 | Sheidler | |
| 6,267,459 B1 | 7/2001 | Becker et al. | |
| 6,273,530 B1 | 8/2001 | Johnson et al. | |
| 6,401,847 B1 | 6/2002 | Lykken | |
| 7,380,892 B2 | 6/2008 | Roenboom | |
| 7,533,741 B2 | 5/2009 | Brazier | |
| 8,430,188 B2 | 4/2013 | Hansen | |
| 9,469,356 B2 | 10/2016 | Gustafson | |
| 9,604,682 B2 | 3/2017 | Marchildon et al. | |
| 2001/0025732 A1* | 10/2001 | Lykken | B62D 55/084 180/9.1 |
| 2003/0025732 A1* | 2/2003 | Prichard | G06F 8/38 715/765 |
| 2006/0220456 A1 | 10/2006 | Sugahara | |
| 2010/0012399 A1 | 1/2010 | Hansen | |
| 2012/0242142 A1* | 9/2012 | Kautsch | B62D 55/14 305/165 |
| 2013/0161918 A1* | 6/2013 | Pare | B62D 7/18 280/93.512 |
| 2014/0069730 A1* | 3/2014 | Lafreniere | B62D 55/04 403/345 |
| 2016/0159414 A1* | 6/2016 | Hansen | B62D 55/104 305/185 |
| 2017/0166270 A1* | 6/2017 | Sewell | B62D 55/14 |

\* cited by examiner

TRACK SYSTEM

CROSS-REFERENCE

The present application is a divisional patent application from Ser. No. 16/975,764 which is a National Stage Entry of PCT/IB2019/051531 filed on Feb. 26, 2019 which claims priority to U.S. Provisional Patent Application Ser. No. 62/635,144, filed Feb. 26, 2018, entitled "Track System", which is incorporated herein by reference in its entirety.

TECHNICAL FIELD

The present technology relates to track systems for vehicles.

BACKGROUND

Certain vehicles, such as agricultural vehicles (e.g., harvesters, combines, tractors, agricultural implements, etc.) and construction vehicles (e.g., bulldozers, front-end loaders, etc.) for example, are used to perform work on ground surfaces that are soft, slippery and/or uneven (e.g., on soil, mud, sand, ice, snow, etc.).

Conventionally, such vehicles have had large wheels with tires on them to move the vehicle along the ground surface. Under certain conditions, such tires may have poor traction on some specific types of ground surface and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheel and tire assemblies on the vehicles.

Such conventional track systems designed for agricultural vehicles typically have a frame supported (at least indirectly) by the vehicle's chassis, a drive sprocket rotationally supported on the frame and operatively connected to the engine of the vehicle to drive an endless track, leading and trailing idler wheels rotationally supported at each end of the frame and mid-rollers rotationally supported by the frame between the leading and trailing idler wheels. Maintaining proper alignment of the various wheels of such prior art track systems is often a challenge, and wheel misalignment typically results in increased rates of wear of one or more components of the track systems, such as the endless track of the track systems.

Some prior art track systems allow for wheel alignment adjustments. For example, U.S. Pat. No. 6,401,847 B1 discloses an undercarriage support system for a tracked vehicle having a drive wheel with a rotational axis comprising first and second elongated outwardly extending members couplable to the vehicle, a first undercarriage bearing support couplable to the vehicle between said first and second outwardly extending members and configured to support an undercarriage, an undercarriage bearing support member slidingly couplable to the outer ends of the two support members and having a second undercarriage bearing support configured to support an undercarriage.

While prior art adjustable track systems are suitable for their intended purposes, they have drawbacks. For example, some prior art track systems, such as the system described in U.S. Pat. No. 6,401,847 B1, provide for wheel alignment adjustments that may reduce stresses and/or wear on some parts, such as the endless track, but in so doing may also in at least some applications increase stresses on other parts of the track system, such as edge stress between a pin and a bushing used to provide for the wheel alignment adjustments, due to misalignment of the pin relative to the bushing resulting from the wheel alignment adjustments for example. Therefore, improvements are possible.

SUMMARY

It is therefore an object of the present technology to ameliorate at least one of the inconveniences present in the prior art.

According to an aspect of the present technology, there is provided a track system for attachment to a vehicle, the track system including: a primary wheel structured to be attachable to the rotatable shaft of the vehicle, the primary wheel having an inboard-facing side and an outboard-facing side opposite the inboard-facing side, the inboard-facing side facing toward the vehicle when the primary wheel is rotationally attached to the vehicle; a frame rotationally supporting a plurality of secondary wheels; a sub-frame supported by the frame, the sub-frame rotationally supporting the primary wheel, the primary wheel and the plurality of secondary wheels supporting an endless track around the primary wheel and the plurality of secondary wheels; a pivot member extending in a vertical direction between the sub-frame and the frame and defining a pivot axis of the frame relative to the sub-frame, the pivot axis extending in the vertical direction; and a fastener securing the frame to the sub-frame in a neutral position, the fastener being disengageable, the frame being pivotable relative to the sub-frame about the pivot axis from the neutral position to a plurality of different toe-in-toe-out positions when the fastener is disengaged, the fastener being re-engageable to secure the frame to the sub-frame in any one of the different toe-in-toe-out positions.

In some implementations, the primary wheel is in driving engagement with the endless track.

In some implementations, the sub-frame includes a downwardly-facing surface; the frame includes an upwardly-facing surface; the downwardly-facing surface of the sub-frame is received on the upwardly-facing surface of the frame and thereby supporting the sub-frame's weight thereon; when the primary wheel is rotationally attached to the vehicle and the vehicle and the track system are stationary on planar horizontal terrain and the track system thereby bears at least part of the vehicle's weight, the downwardly-facing surface of the sub-frame and the upwardly-facing surface of the frame are horizontal.

In some implementations, when the fastener is disengaged and the frame is pivoted relative to the sub-frame about the pivot axis, the downwardly-facing surface of the sub-frame pivots relative to the upwardly-facing surface of the frame.

In some implementations, the frame defines a recess, and the sub-frame is received in the recess.

In some implementations, the recess is defined in a top side of the frame.

In some implementations, the sub-frame and the frame define a plurality of gaps between the sub-frame and the frame, the plurality of gaps defining a pivot range of the frame about the pivot axis within which the frame is pivotable relative to the sub-frame in any one of clockwise and counter-clockwise directions about the pivot axis when the fastener is disengaged.

In some implementations, the pivot range has a magnitude that is between 0.5 degrees and ten degrees about the pivot axis.

In some implementations, the frame has a neutral position about the pivot axis, and the pivot range of the frame is symmetric about the neutral position.

In some implementations, the fastener is received in a sub-frame aperture defined in the sub-frame and in a frame aperture defined in the frame, at least one of the sub-frame and frame apertures being larger than the other one of the sub-frame and frame apertures and being dimensioned to define the pivot range of the frame when the fastener is disengaged and remains received in the sub-frame and frame apertures.

In some implementations, the fastener is received in a sub-frame aperture defined in the sub-frame and in a frame aperture defined in the frame, and one of the sub-frame and frame apertures is larger than the other one of the sub-frame and frame apertures.

In some implementations, the sub-frame aperture passes through the sub-frame, the frame aperture terminates in the frame and is threaded, the sub-frame aperture is larger than the frame aperture, the fastener includes a bolt, and the bolt is threaded into the frame aperture.

In some implementations, when the primary wheel is rotationally attached to the vehicle and the vehicle and the track system are stationary on planar horizontal terrain and the track system thereby bears at least part of the vehicle's weight, the pivot axis is vertical.

In some implementations, the pivot member extends from one of the frame and the sub-frame toward the other one of the frame and the sub-frame, and the other one of the frame and the sub-frame defines a cavity that receives the pivot pin therein.

In some implementations, the track system includes a plurality of fasteners, the fastener being one of the plurality of fasteners, the plurality of fasteners attaching the frame to the sub-frame to prevent pivoting of the frame relative to the sub-frame about the pivot axis, the plurality of fasteners being disengageable, the frame being pivotable relative to the sub-frame about the pivot axis when the plurality of fasteners is disengaged.

In some implementations, the primary wheel is rotatable relative to the sub-frame about a rotation axis that extends in a transverse direction when the primary wheel is rotationally attached to the vehicle and the vehicle and the track system are stationary on planar horizontal terrain; a first number of fasteners of the plurality of fasteners is positioned forward of the rotation axis; and a second number of fasteners of the plurality of fasteners is positioned rearward of the rotation axis.

In some implementations, each fastener of the plurality of fasteners extends vertically in the frame and the sub-frame when the primary wheel is rotationally attached to the vehicle and the vehicle and the track system are stationary on planar horizontal terrain.

In some implementations, the pivot axis passes through the rotation axis of the primary wheel.

In some implementations, the track system includes an adjustment assembly operatively engaging the frame and the sub-frame, the adjustment assembly including a threaded member, the threaded member being rotatable relative to the frame and the sub-frame to thereby pivot the frame relative to the sub-frame about the pivot axis when the plurality of fasteners is disengaged.

In some implementations, the threaded member is a first threaded member, the first member being positioned forward of the pivot axis, and the adjustment assembly includes a second threaded member positioned rearward of the pivot axis, the second threaded member being rotatable relative to the frame and the sub-frame to thereby pivot the frame relative to the sub-frame about the pivot axis when the plurality of fasteners is disengaged.

In some implementations, the sub-frame is positioned on the outboard-facing side of the primary wheel.

In some implementations, the inboard-facing side of the primary wheel is structured to be attachable to at least one of: a shaft coaxially with the shaft, a wheel hub coaxially with the wheel hub, a final drive coaxially with the final drive, and a planetary gearbox output flange coaxially with the planetary gearbox output flange.

According to another aspect of the present technology, there is provided a track system for attachment to a vehicle, the track system comprising: a primary wheel structured to be rotationally attachable to the vehicle, the primary wheel having an inboard-facing side and an outboard-facing side opposite the inboard-facing side, the inboard-facing side facing toward the vehicle when the primary wheel is rotationally attached to the vehicle; a frame rotationally supporting a plurality of secondary wheels, the frame defining a recess therein, the recess having a rearwardly-facing surface, a forwardly-facing surface facing the rearwardly-facing surface, and an upwardly-facing surface intermediate the rearwardly-facing surface and the forwardly-facing surface; a sub-frame received in the recess of the frame, the sub-frame having a downwardly-facing surface that is supported on the upwardly-facing surface of the frame, the sub-frame and the rearwardly-facing surface of the frame defining a first gap therebetween, the sub-frame and the forwardly-facing surface of the frame defining a second gap therebetween, the sub-frame rotationally supporting the primary wheel, the primary wheel and the plurality of secondary wheels supporting an endless track around the primary wheel and the plurality of secondary wheels; and a fastener securing the frame to the sub-frame in a neutral position, the fastener being disengageable, the first and second gaps being dimensioned to allow the frame to pivot and translate relative to the sub-frame from the neutral position to a plurality of different positions when the fastener is disengaged, the fastener being re-engageable to secure the frame to the sub-frame in any one of the plurality of different positions.

In some implementations, the primary wheel is in driving engagement with the endless track.

In some implementations, the downwardly-facing surface of the frame is planar; the upwardly-facing surface of the frame is planar; and the downwardly-facing surface of the sub-frame is received on the upwardly-facing surface of the frame when the frame is secured to the sub-frame in any one of the plurality of different positions.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
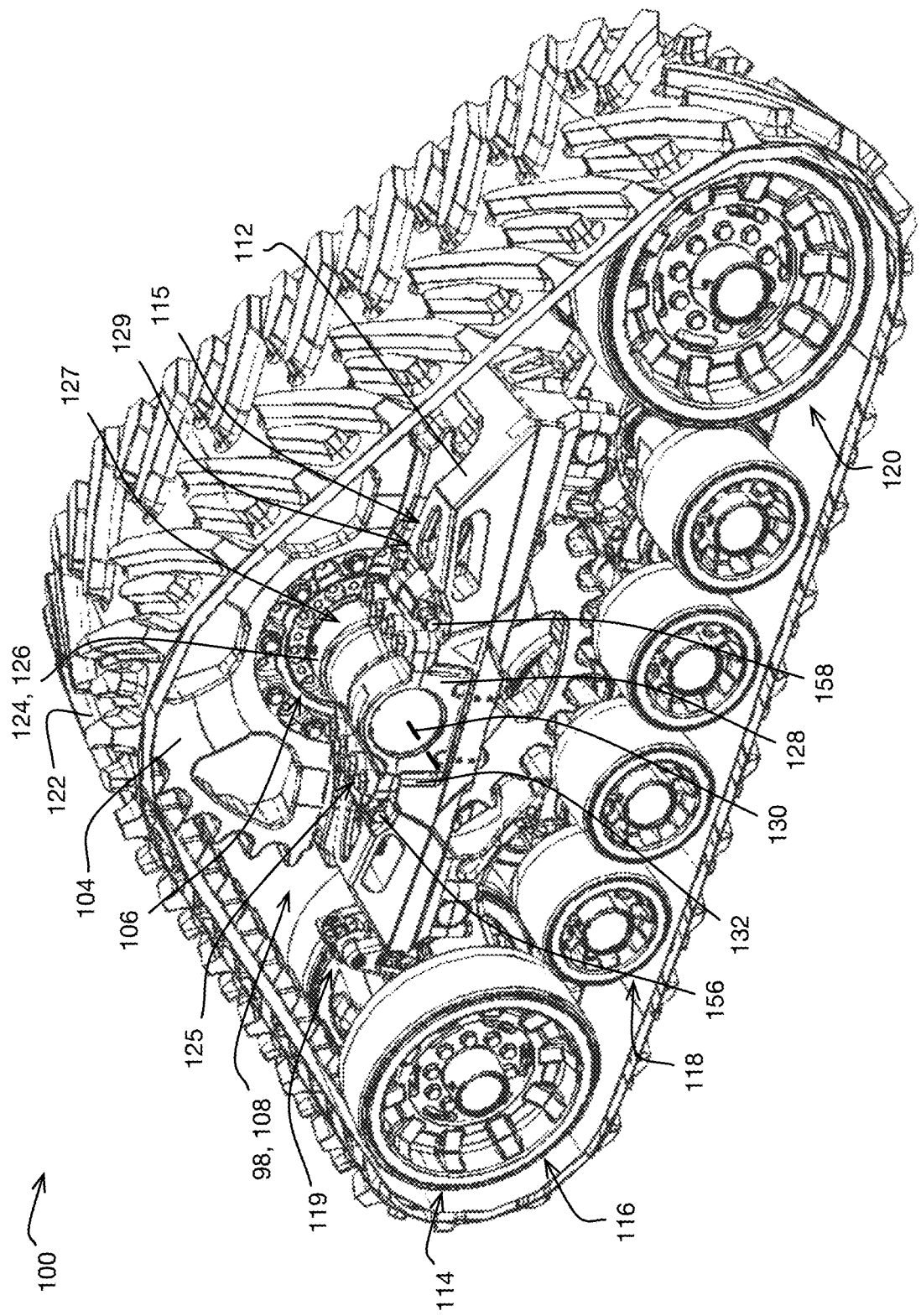
FIG. 1 is a perspective view of an outboard-facing side of a track system.
Figure 2:
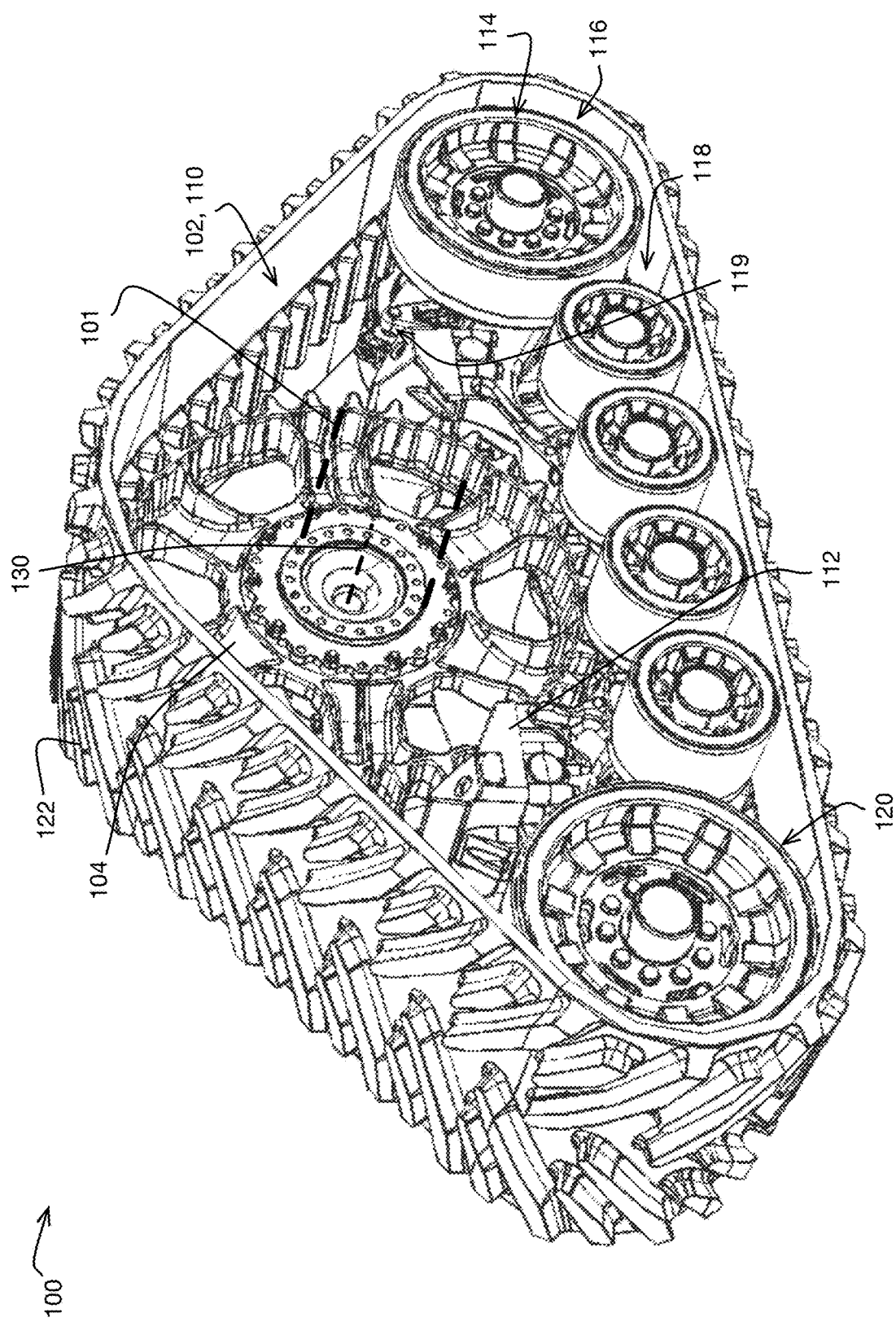
FIG. 2 a perspective view of an inboard-facing side of the track system of FIG. 1.

FIGS. 1 and 2 show a track system 100 for attachment to a vehicle. FIG. 1 shows an outboard-facing side 98 of the track system 100 that faces laterally away from the vehicle when the track system 100 is attached to the vehicle. FIG. 2 shows an inboard-facing side 102 of the track system 100 that faces toward the vehicle when the track system 100 is mounted to the vehicle.

The track system 100 includes a primary wheel 104 structured to be attachable to a rotatable shaft 101 (shown schematically in FIG. 2) of a vehicle by coaxial attachment to a wheel hub (not shown) supported on an outer end of the rotatable shaft 101 of the vehicle. The coaxial attachment is provided by a plurality of bolts (not shown) received through a corresponding plurality of apertures 106 defined through the primary wheel 104, and into corresponding threaded apertures (not shown) in the wheel hub of the vehicle, similar to the attachment of a vehicle's wheel to a wheel hub of that vehicle. In one application, the wheel hub is an existing wheel hub of the vehicle, and the track system 100 replaces the original wheel that was supported by the wheel hub of the vehicle.

The rotatable shaft 101 could be a drive shaft or an idle (non-driven) shaft of a vehicle. It is contemplated that the primary wheel 104 could be attachable to any suitable structure of a vehicle, such as to a planetary gearbox output flange or shaft of a vehicle, or a final drive of a vehicle. It is also contemplated that the primary wheel 104 could be structured to be attachable directly to a shaft of a vehicle for example. Examples of suitable vehicles include a combine and a tractor.

In the present implementation, the primary wheel 104 is a drive sprocket 104 that has an outboard-facing side 108 and an inboard-facing side 110 opposite outboard-facing side 108. The inboard-facing side 110 of the primary wheel 104 faces toward the vehicle when the primary wheel 104 is attached to the rotatable shaft 101 of the vehicle.

The track system 100 further includes a frame 112 rotationally supporting a plurality of secondary wheels 114 thereon. In the present implementation, the plurality of secondary wheels 114 includes a pair of leading idler wheels 116, four pairs of mid-roller wheels 118, further herein referred to as mid-rollers 118, and a pair of trailing idler wheels 120. The leading idler wheels 116 are positioned at a front end of the frame 112. The trailing idler wheels 120 are positioned at a rear end of the frame 112.

The mid-rollers 118 are positioned intermediate the leading idler wheels 116 and the trailing idler wheels 120. The primary wheel 104 is positioned above the leading idler wheels 116, the trailing idler wheels 120, and the mid-rollers 118. The secondary wheels 114 are symmetrically positioned on the frame 112 relative to the primary wheel 104 on the outboard-facing side 98 of the track system 100.

The primary wheel 104 and the secondary wheels 114 support an endless track 122 thereabout, and the primary wheel 104 is in driving engagement with the endless track 122. The track system 100 further includes a tensioner assembly 119 connecting the frame 112 to the leading idler wheels 116 and being operable to adjust tension in the endless track 122. It is contemplated that the tensioner assembly 119 could be located in a different part of the track system 100 and could operatively connect other wheels thereof to the frame 112 so as to make the position of those wheels selectively adjustable relative to the frame 112 for adjusting tension in the endless track 122. It is contemplated that any suitable tensioner assembly could be used.

It is contemplated that a different arrangement of the primary wheel 104 and/or the secondary wheels 114 could be used. It is contemplated that the primary wheel 104 need not be in driving engagement with the endless track 122, such as in implementations in which the track system 100 is to be attached (via the primary wheel 104) to a non-driven shaft of a vehicle. It is also contemplated that the primary wheel 104 could be a different type of wheel and not necessarily the drive sprocket 104.

In the present implementation, the primary wheel 104 is rotationally supported by a sub-frame 124, and the sub-frame 124 is in turn supported by the frame 112 of the track system 100. The sub-frame 124 in this implementation is cast as a single piece from a suitable metal and defines a cylindrical cavity (not shown) therein. A shaft (not shown) of the drive sprocket 104 is rotationally received in the cavity via a bearing assembly (not shown). It is contemplated that the sub-frame 124 could have a different construction, including a multi-part construction.

The shaft of the drive sprocket 104 that rotates inside the cylindrical cavity in the sub-frame 124 defines a rotation axis 130 of the drive sprocket 104. The sub-frame 124 and the shaft of the drive sprocket 104 are positioned on the outboard-facing side 108 of the drive sprocket 104. The shaft of the drive sprocket 104 extends from the outboard-facing side 108 of the drive sprocket 104 and into the cavity. The shaft of the drive sprocket 104 is secured in the cylindrical cavity of the sub-frame 124.

Accordingly, the drive sprocket 104 is secured to the sub-frame 124 and is rotatable relative to the sub-frame 124 about the rotation axis 130. The rotation axis 130 extends in a transverse direction when the primary wheel 104 is attached to the rotatable shaft 101 of the vehicle and the vehicle and the track system 100 are stationary on planar horizontal terrain. It is contemplated that a different rotational and/or securement attachment of the drive sprocket 104 to the sub-frame 124 could be used. It is also contemplated that the sub-frame 124 and/or the shaft of the drive sprocket 104 could be positioned at least in part, and in some implementations completely, on the inboard-facing side 110 of the primary wheel 104.

The sub-frame 124 is received in a recess 132 defined in a top side 115 of the frame 112 and is attached to the frame 112 via sixteen fasteners 125 which secure the frame 112 to the sub-frame 124 and prevent pivoting (described in more detail herein below) of the frame 112 relative to the sub-frame 124. In the present implementation, the fasteners 125 are bolts 125, fitted with custom heavy duty washers under the cap of each one of the bolts 125. Eight of the bolts 125 are received through a plurality of apertures 121 (FIG. 4) defined in a top side 127 of the sub-frame 124 and in corresponding ones of threaded apertures 123 (FIG. 3) defined in a top side 129 of the frame 112.

The other eight of the bolts 125 are received through a plurality of apertures 135 (FIG. 3) defined in a bottom side 131 of the frame 112 and in corresponding ones of threaded apertures 137 (FIG. 4) defined in a bottom side 133 of the sub-frame 124. The bolts 125 are tightened to attach the frame 112 to the sub-frame 124 and thereby immobilize the frame 112 relative to the sub-frame 124. Each of the bolts 125 extends vertically in the frame 112 and the sub-frame 124 when the primary wheel 104 is attached to the rotatable shaft 101 of the vehicle and the vehicle and the track system 100 are stationary on planar horizontal terrain. It is contemplated that a different number and/or type and/or arrangement of the fasteners 125 could be used.

Figure 3:
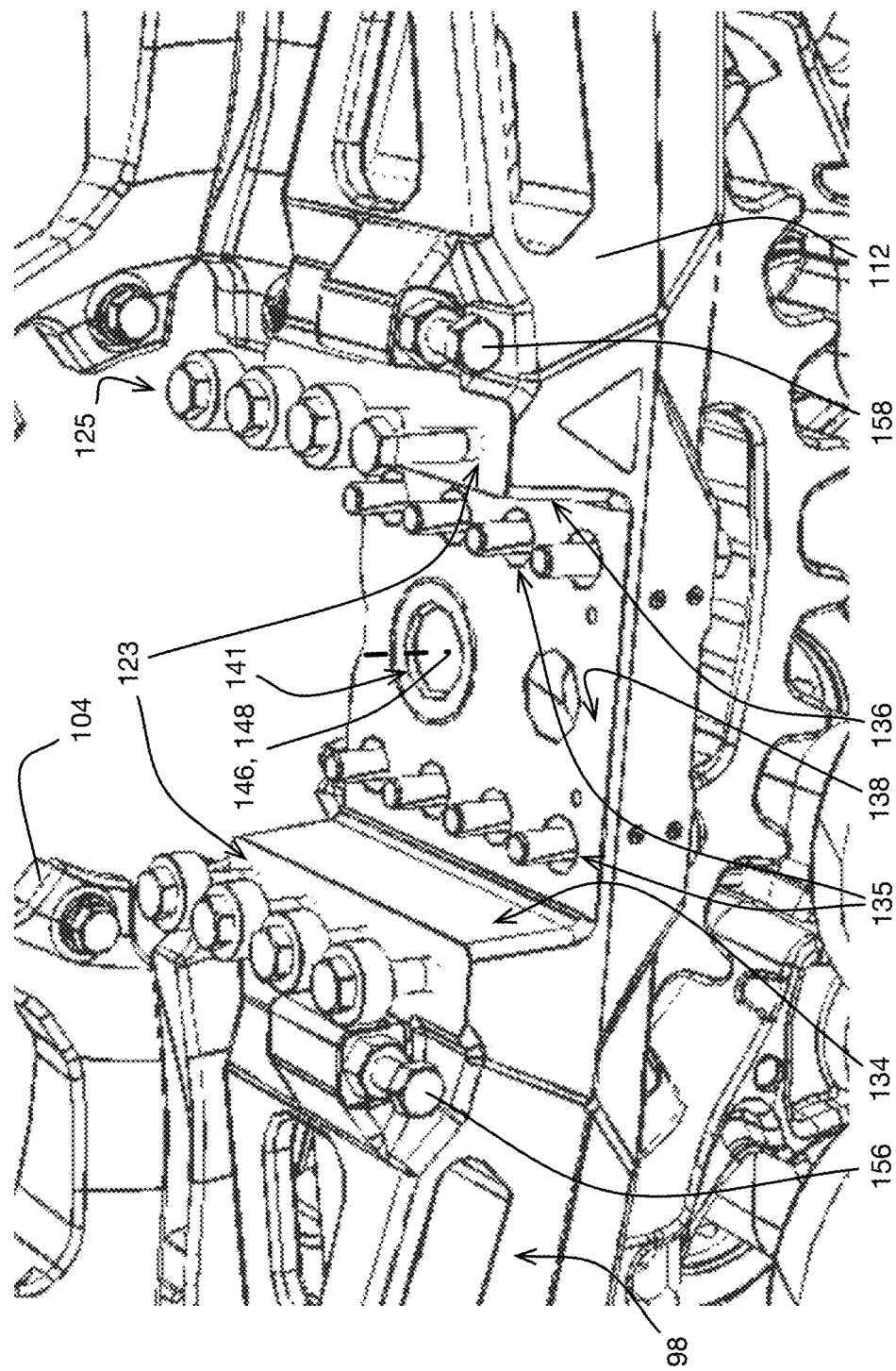
FIG. 3 is a close-up a perspective view of a central part of the track system of FIG. 1 on the outboard-facing side, with some parts of the track system being removed to better show some parts of the track system.

As best shown in FIG. 3, in the present implementation, the recess 132 is defined by a rearwardly-facing surface 134, a forwardly-facing surface 136, and an upwardly-facing surface 138 of the frame 112. The rearwardly-facing surface 134 faces the forwardly-facing surface 136 and is a mirror image of the forwardly-facing surface 136. It is contemplated that the rearwardly-facing surface 134 need not be a mirror image of the forwardly-facing surface 136.

It is also contemplated that the recess 132 could be defined in a different part of the frame 112. In the present implementation, the upwardly-facing surface 138 is planar and defines a cavity 141 therein. In the present implementation, the cavity 141 is cylindrical and extends downward into, and through, the frame 112 in a vertical direction 146. It is contemplated that the cavity 141 could have a different shape. It is contemplated that the cavity 141 could terminate within the frame 112.

Figure 4:
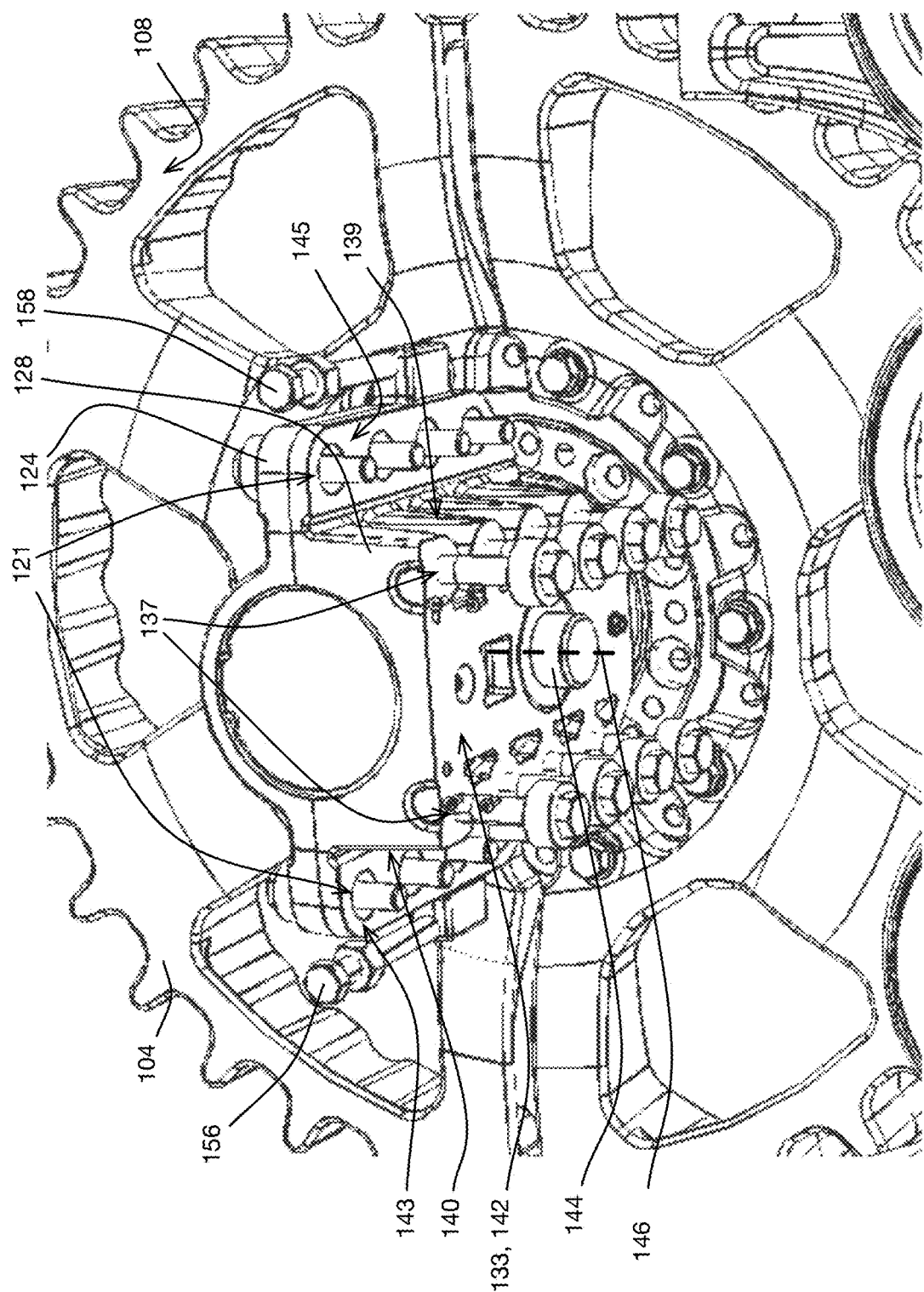
FIG. 4 is a different close-up perspective view of the central part of the track system of FIG. 1 on the outboard-facing side, with some parts of the track system being removed to better show some parts of the track system.

Now referring to FIG. 4, a lower portion 128 of the sub-frame 124 is defined by rearwardly-facing surface 139, a forwardly-facing surface 140, a downwardly-facing surface 142, and downwardly-facing surfaces 143, 145 of corresponding flanges of the sub-frame 124. In the present implementation, the rearwardly-facing surface 139 is opposite the forwardly-facing surface 140 and is a mirror image thereof.

It is contemplated that the rearwardly-facing surface 139 need not be a mirror image of the forwardly-facing surface 140. In the present implementation, the downwardly-facing surface 142 is planar and is received on, and contacts, the upwardly-facing surface 138. In other words, the downwardly-facing surface 142 mates with the upwardly-facing surface 138. It is contemplated that the downwardly-facing surface 142 and the upwardly-facing surface 138 could have other mating surface shapes, such as mating concave shapes.

A pivot member 144 extends downward in a vertical direction 146 from the downwardly-facing surface 142 of the sub-frame 124. In the present implementation, the pivot member 144 is a cylindrical metal pivot pin 144 that is cast integral with the sub-frame 124. It is contemplated that the pivot member 144 could have a different geometry and/or construction and could include a bearing for example that would achieve the functionality described herein. It is also contemplated that the pivot member 144 could be a piece separate from the sub-frame 124.

The pivot pin 144 is positioned between the sub-frame 124 and is received in the cavity 141 of the frame 112. In the present implementation, the bottom end of the pivot pin 144 does not abut against any surface and therefore is relieved in that the weight of the sub-frame 124 is transferred into the frame 112 via the downwardly-facing surfaces 142, 143, 145 of the sub-frame 124. It is contemplated that in some implementations in which the cavity 141 terminates in the frame 112, at least some of the weight of the sub-frame 124 could be transferred into the frame 112 via the pivot pin 144.

It is contemplated that the sub-frame 124 could be shaped differently, such that at the weight of the sub-frame 124 could be transferred into the frame 112 via the downwardly-facing surface 142 and not via the downwardly-facing surfaces 143, 145 for example. It is also contemplated that the pivot member 144 could extend upward from the frame 112 in the vertical direction 146 and the cavity 141 could be defined in the downwardly-facing surface 142 of the sub-frame 124 for example.

In the present implementation, there is a slight clearance between the outer side surface of the pivot pin 144 and the inner side surface of the cavity 141, which clearance permits the pivot pin 144 to pivot clockwise and counter-clockwise within the cavity 141. The pivot pin 144 thereby defines a pivot axis 148 about which the frame 112 can pivot relative to the sub-frame 124 when the bolts 125 are disengaged by being loosened or removed. As shown, in the present implementation the pivot axis 148 extends in the vertical direction 146 and passes through the rotation axis 130 of the primary wheel 104. It is contemplated that in some implementation, the pivot axis 148 could be offset from the rotation axis 130 of the primary wheel 104.

The rearwardly-facing surface 134 and the forwardly-facing surface 136 of the are recess 132 are shaped and spaced from each other such that when the sub-frame 124 is received in the recess 132, the rearwardly-facing surface 139 and the forwardly-facing surface 140 of the sub-frame 124 are spaced from the rearwardly-facing surface 134 and the forwardly-facing surface 136 of the are recess 132, respectively.

Figure 5:
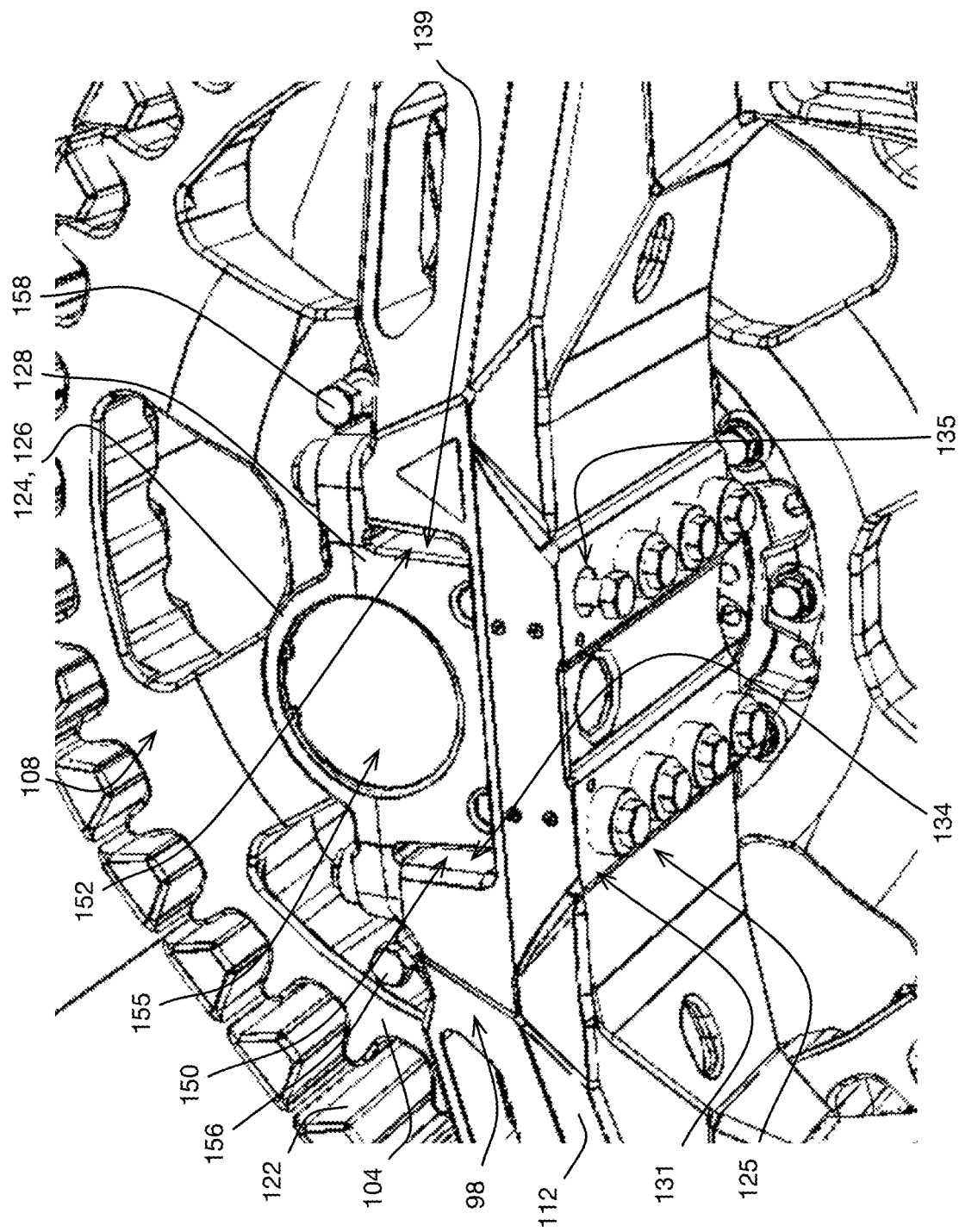
FIG. 5 is a close-up yet another perspective view of the central part of the track system of FIG. 1 on the outboard-facing side, with a washer of one of a plurality of bolts being removed to better show an aperture in which that one of the plurality of bolts is received.

Now referring to FIG. 5, this way, the sub-frame 124 and the frame 112 define two gaps 150, 152 between the sub-frame 124 and the frame 112, and more particularly between the corresponding ones of the surfaces 134, 136, 139, 140 to permit for the pivoting of the frame 112 relative to the sub-frame 124 when the bolts 125 are loosened or removed. To this end, the apertures 135 defined in the bottom side of the frame 112 are larger than the corresponding threaded apertures 137 defined in the bottom side of the sub-frame 124. Similarly, the apertures 121 defined in the top side of the sub-frame 124 are larger than the corresponding threaded apertures 123 defined in the top side of the frame 112.

These larger apertures 121, 135 are sized large enough to allow the frame 112 to pivot relative to the sub-frame 124 about the pivot axis 148 when the bolts 125 are loosened or removed, until at least one of the side surfaces 134, 136 of the recess 132 abuts against a corresponding one of the side surfaces 139, 140 of the sub-frame 124. In this way, the gaps 150, 152, and more particularly their geometries, define a pivot range 154, shown schematically in FIG. 6, of the frame 112 about the pivot axis 148 within which the frame 112 is pivotable relative to the sub-frame 124 in any one of clockwise and counter-clockwise directions about the pivot axis 148 when the bolts 125 are loosened or removed.

Figure 6:
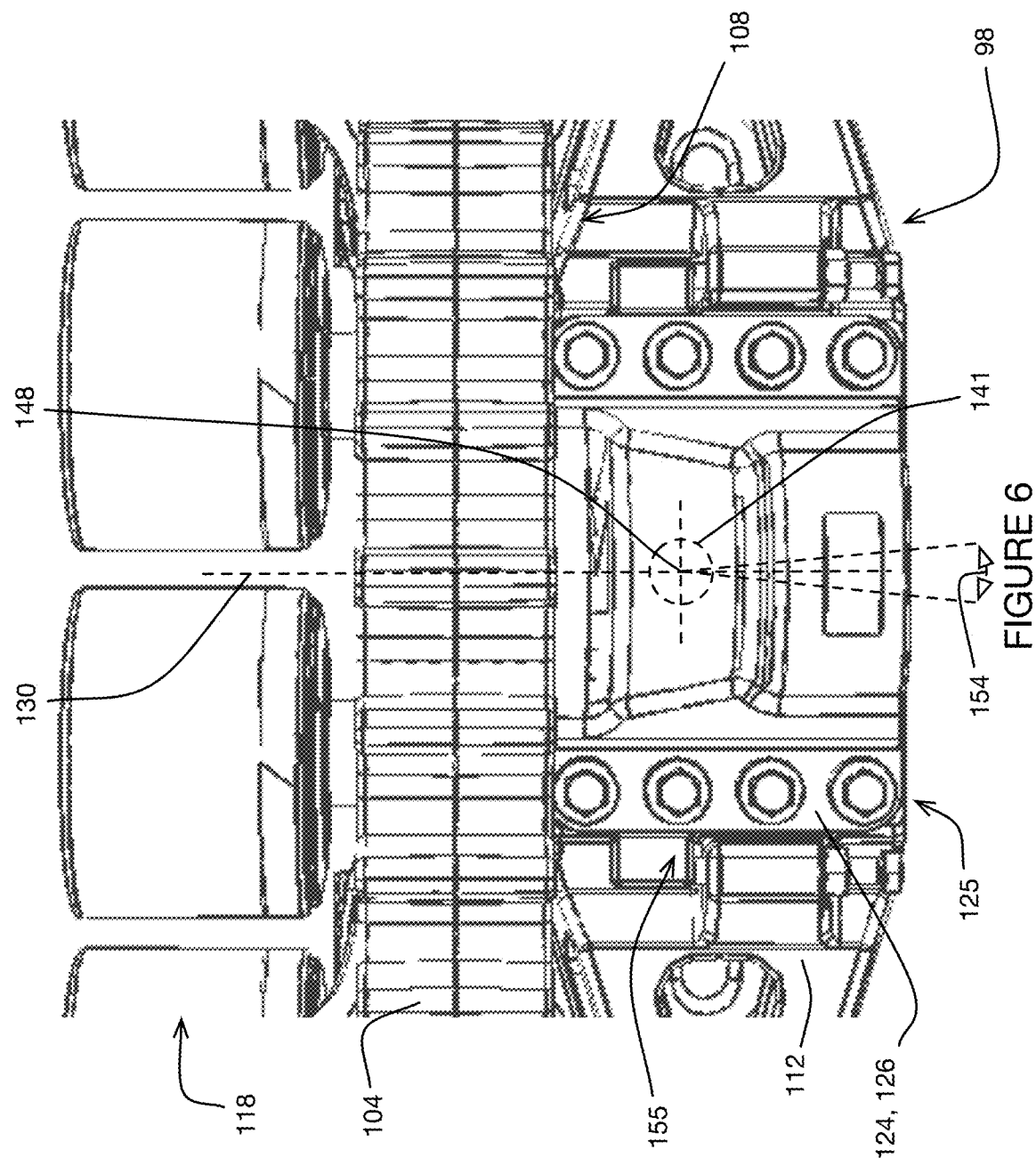
FIG. 6 is a top plan view of the central part of the track system of FIG. 1, with an endless track of the track system being removed to better show some parts of the track system.

In the present implementation, the pivot range 154 is 5 degrees about the pivot axis 148, or 2.5 degrees in either one of the clockwise and counter-clockwise directions about the pivot axis 148 from a neutral position 155 of the frame 112 shown in FIGS. 5 and 6. In other words, in the present implementation, the pivot range 154 is symmetric about the pivot axis 148 relative to the neutral position 155 of the frame 112. It is contemplated that the pivot range 154 could be different. For example, in some implementations, the pivot range 154 is 0.5 degrees. As another example, in some implementations, the pivot range 154 is ten degrees. It is contemplated that the pivot range 154 in some implementations could by asymmetric relative to the neutral position 155 of the frame 112.

It is contemplated that the larger apertures 121, 135 could be sized differently, including being sized to define the pivot range 154 together with or instead of the gaps 150, 152. That is, it is contemplated that the larger apertures 121, 135 could be sized such that when the frame 112 is pivoted about the pivot axis 148 in a given direction, after a given amount of pivoting in the given direction, one or more of the bolts 125 would contact one or more corresponding surfaces defining the larger apertures 121, 135 and thereby prevent further pivoting of the frame 112 in that direction before at least one of the surfaces 139, 140 of the sub-frame 124 engages a corresponding one of the opposed surfaces 134, 136 of the recess 132 to prevent further pivoting of the frame 112 in that direction.

It is contemplated that any other features, including stoppers or shims for example, could be used to define the pivot range 154 of the frame 112 instead of or in addition to the surfaces 134, 136 of the recess 132 and/or the dimensions, shapes and relative positions of the apertures 121, 135. It is contemplated that one or more of the larger apertures 121, 135 could have a different shape. It is also contemplated that at least some corresponding pairs of the apertures 121, 123, 135, 137 could extend completely through both the frame 112 and the sub-frame 124.

It is contemplated that in some such cases, one or more different types of fasteners could be used, such as for example bolt-and-nut combinations instead of the bolts 125 to compress the frame 112 and the sub-frame 124 together and to thereby secure the frame 112 to the sub-frame 124 and immobilize the frame 112 relative to the sub-frame 124. It is contemplated that one or more different types of fasteners could be used in any particular implementation of the track system 100 instead of, in combination with, or in addition to the bolts 125.

In the present implementation, when the primary wheel 104 is attached to a rotatable shaft 101 of a vehicle and the vehicle and the track system 100 are stationary on planar horizontal terrain and the track system 100 thereby bears at least part of the vehicle's weight, the upwardly-facing surface 138 of the frame 112 and the downwardly-facing surface 142 of the sub-frame 124 are horizontal (parallel to the planar horizontal terrain) and the pivot axis 148 is vertical. When the bolts 125 are disengaged (that is, loosened or removed) the frame 112 can be pivoted relative to the sub-frame 124 about the pivot axis 148, in which case the downwardly-facing surface 142 of the sub-frame 124 pivots relative to the upwardly-facing surface 138 of the frame 112.

In an aspect, the horizontal orientation of the surfaces 138, 142 and the vertical orientation of the pivot axis 148 help establish alignment of the endless track 122 during adjustments of the relative position of the frame 112 to the sub-frame 124. It is contemplated that in some implementations, the surfaces 138, 142 could have some offset from horizontal, such as by 0.1 or 0.2 degrees for example. It is also contemplated that the pivot axis 148 could have some corresponding offset from vertical, such as by 0.1 or 0.2 degrees for example. In some applications, angle shims or other similar elements could be added in between the frame 112 and the sub-frame 124 to change an orientation of the frame 112 relative to the sub-frame 124.

In the present implementation, the track system 100 includes a pair of adjustment bolts 156, 158. The adjustment bolts 156, 158 are received through corresponding threaded apertures defined laterally through the frame 112 and at their ends abut against corresponding outboard-facing surfaces of the sub-frame 124 on opposite sides of the rotation axis 130 of the primary wheel 104. The adjustment bolt 156 is positioned forward of the pivot axis 148. The adjustment bolt 158 is positioned rearward of the pivot axis 148.

When the bolts 125 are disengaged, the position of the frame 112 relative to the sub-frame 124, further herein referred to as the toe-in-toe-out position of the frame 112, can be adjusted by turning, with a suitable tool such as a wrench for example, the adjustment bolts 156, 158 in opposite directions about their respective rotation axes, when the track system 100 is lifted off terrain for example, to pivot the frame 112 relative to the sub-frame 124 in either one of clockwise and counter-clockwise directions about the pivot axis 148.

In some implementations and applications of the track system 100, and depending on the vehicle for example, the toe-in-toe-out position of the frame 112 can be adjusted by turning, with a suitable tool such as a wrench for example, the adjustment bolts 156, 158 in opposite directions about their respective rotation axes when the track system 100 is mounted to the vehicle and stationary on terrain.

Once the toe-in-toe-out position of the frame 112, and therefore also an alignment of the wheels 104, 116, 118, 120 relative to each other as well as an alignment of the endless track 122 relative to the wheels 104, 116, 118, 120, are suitably adjusted, all of the bolts 125 are re-tightened to immobilize the frame 112 relative to the sub-frame 124. After all of the bolts 125 are re-tightened, the adjustment bolts 156, 158 could be left in their corresponding positions, or loosened until the ends of the adjustment bolts 156, 158 no longer contact the sub-frame 124 without materially affecting securement of the frame 112 relative to the sub-frame 124.

In other words, in the present implementation, the adjustment bolts 156, 158 are relieved in that a majority of forces that may be transferred between the frame 112 and the sub-frame 124 when the track system 100 is in use are carried by the bolts 125 and engagement of the adjustment bolts 156, 158 with the sub-frame 124 is not required to hold the sub-frame 124 in place relative to the frame 112. It is contemplated that a different arrangement of the adjustment bolts 156, 158 and/or the bolts 125 could be used in which at least one of the adjustment bolts 156, 158 would assist in immobilizing the frame 112 relative to the sub-frame 124 more than they do in the present implementation.

Each of the adjustment bolts 156, 158 is an example of a threaded member. It is contemplated that a different number of and/or arrangement and/or type of threaded members could be used. The adjustment bolts 156, 158 are an example of an adjustment assembly used to assist an operator in adjusting the toe-in-toe-out position of the frame 112. It is contemplated that a different arrangement of and/or a different position of and/or a different adjustment assembly could be used. It is also contemplated that the adjustment assembly could be omitted.

Figure 7:
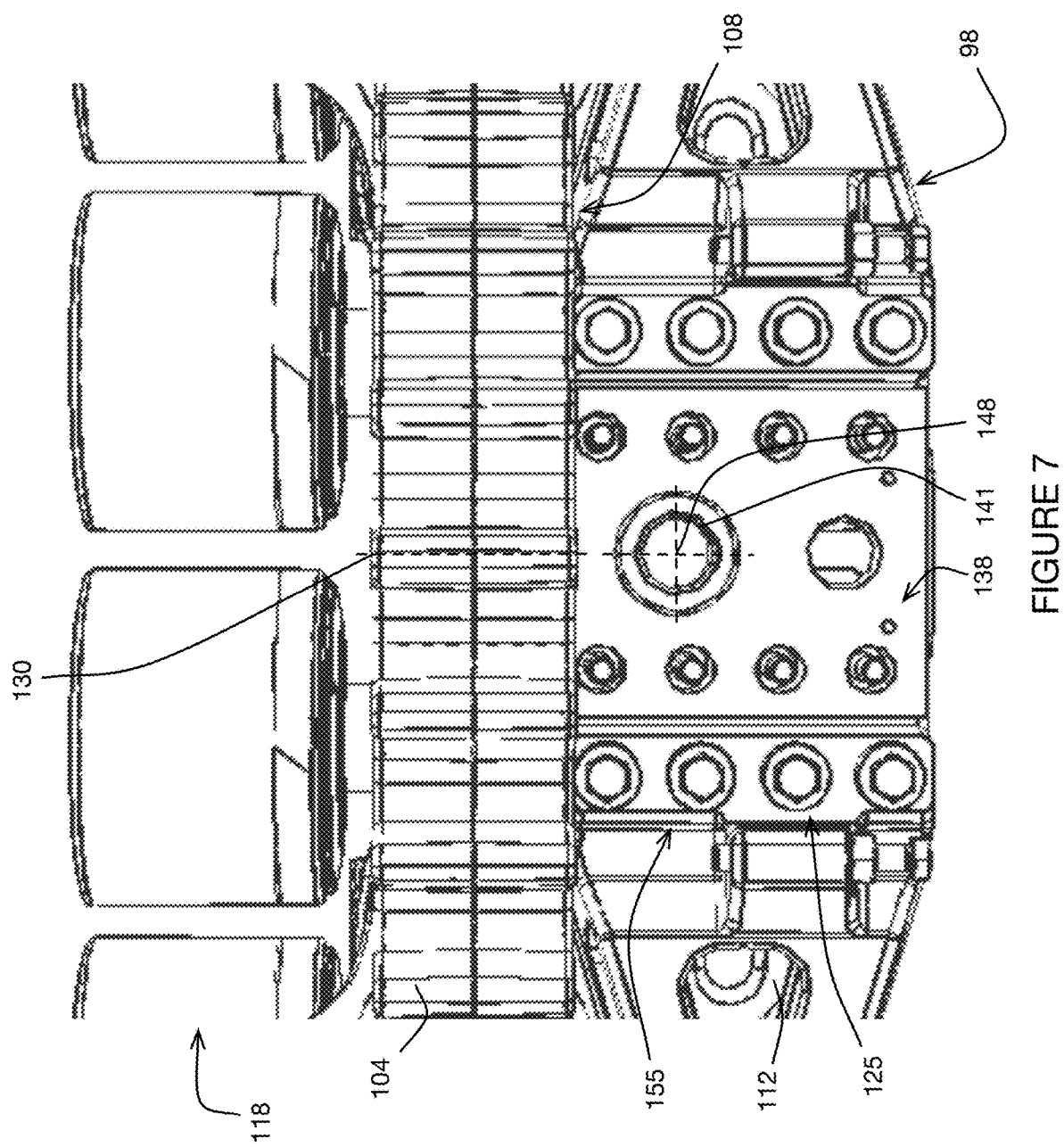
FIG. 7 is the top plan view of the central part of the track system of FIG. 6, with the endless track and some additional parts of the track system being removed to better show some parts of the track system.

Referring to FIGS. 6 and 7, a top plan view of a central part of the track system 100 is shown. In both of these figures the endless track 122 is removed to better show other parts of the track system 100 and the endless track 122 is instead shown schematically with hidden lines. In FIG. 7, both the endless track 122 and the sub-frame 124 are removed to better show other parts of the track system 100, and a position of the cavity 141, and therefore also the pivot member 144, relative to the frame 112 and the drive sprocket 104.

While a particular relative position of the cavity 141 and the pivot member 144 is shown, it is contemplated that in some implementations, the position of the pivot member 144 and the cavity 141 relative to the frame 112 and the sub-frame 124 could be different, to suit different implementations and/or applications of the track system 100 for example. For example, it is contemplated that the cavity 141 and the pivot member 144, and hence the pivot axis 148, could be offset forward or rearward of the rotation axis 130 of the drive sprocket 104. It is also contemplated that the cavity 141 and the pivot member 144, and hence the pivot axis 148, could be closer to the outboard-facing side 98 of the track system 100, or the inboard-facing side 102 of the track system 100.

Figure 8:
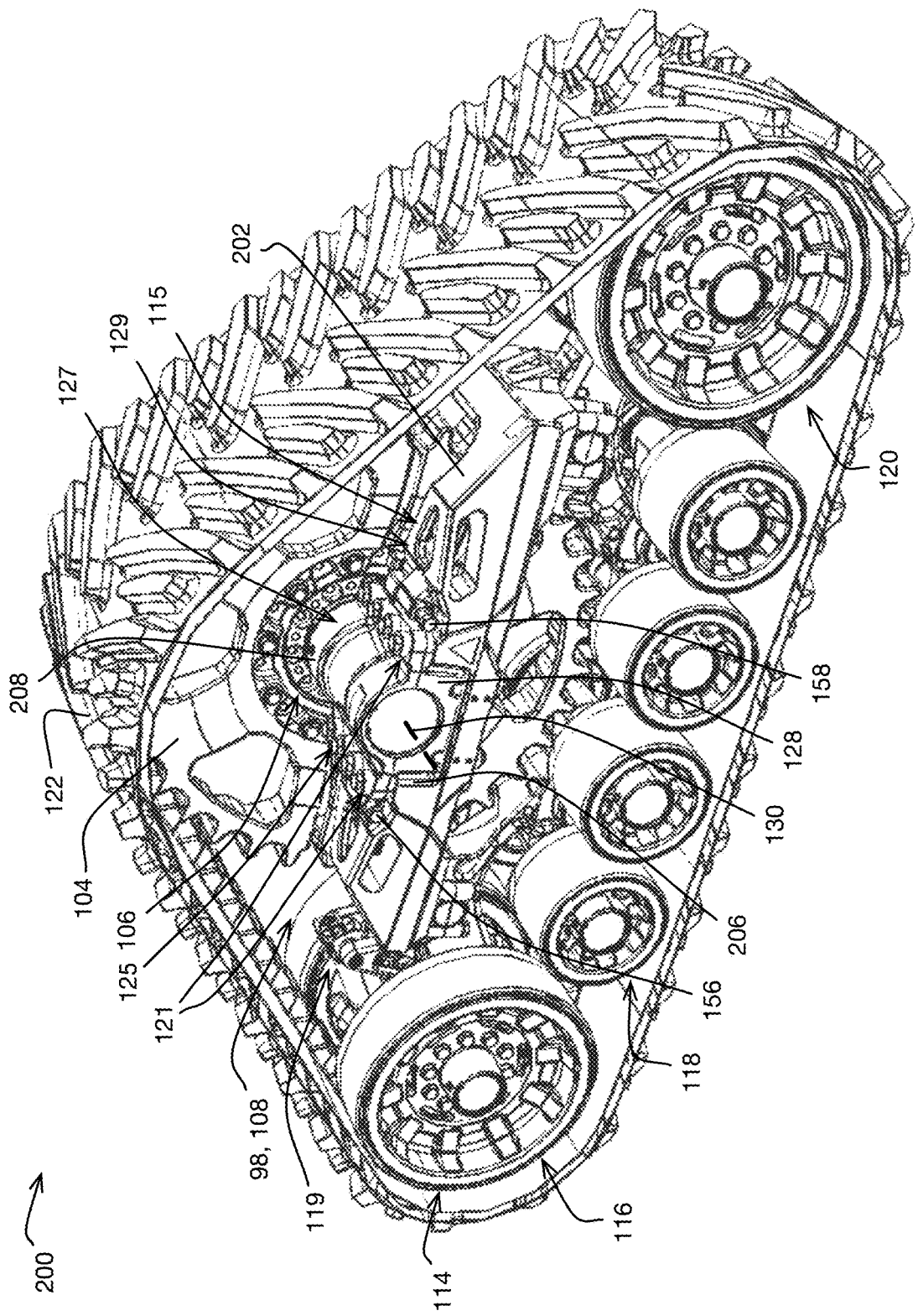
FIG. 8 is a perspective view of an outboard-facing side of another implementation of the track system of FIG. 1.
Figure 9:
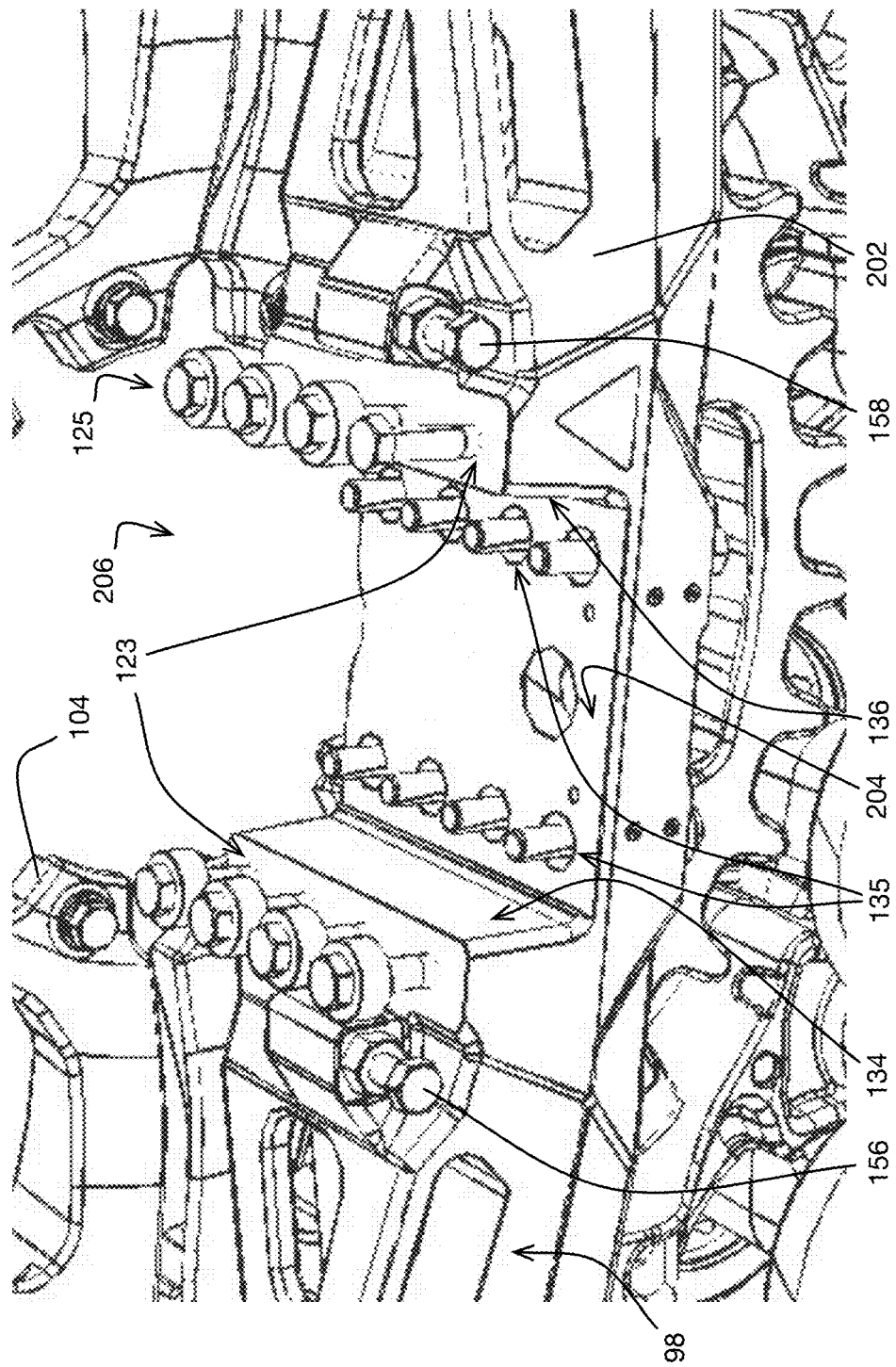
FIG. 9 is a close-up a perspective view of a central part of the track system of FIG. 8 on the outboard-facing side, with some parts of the track system being removed to better show some parts of the track system.
Figure 10:
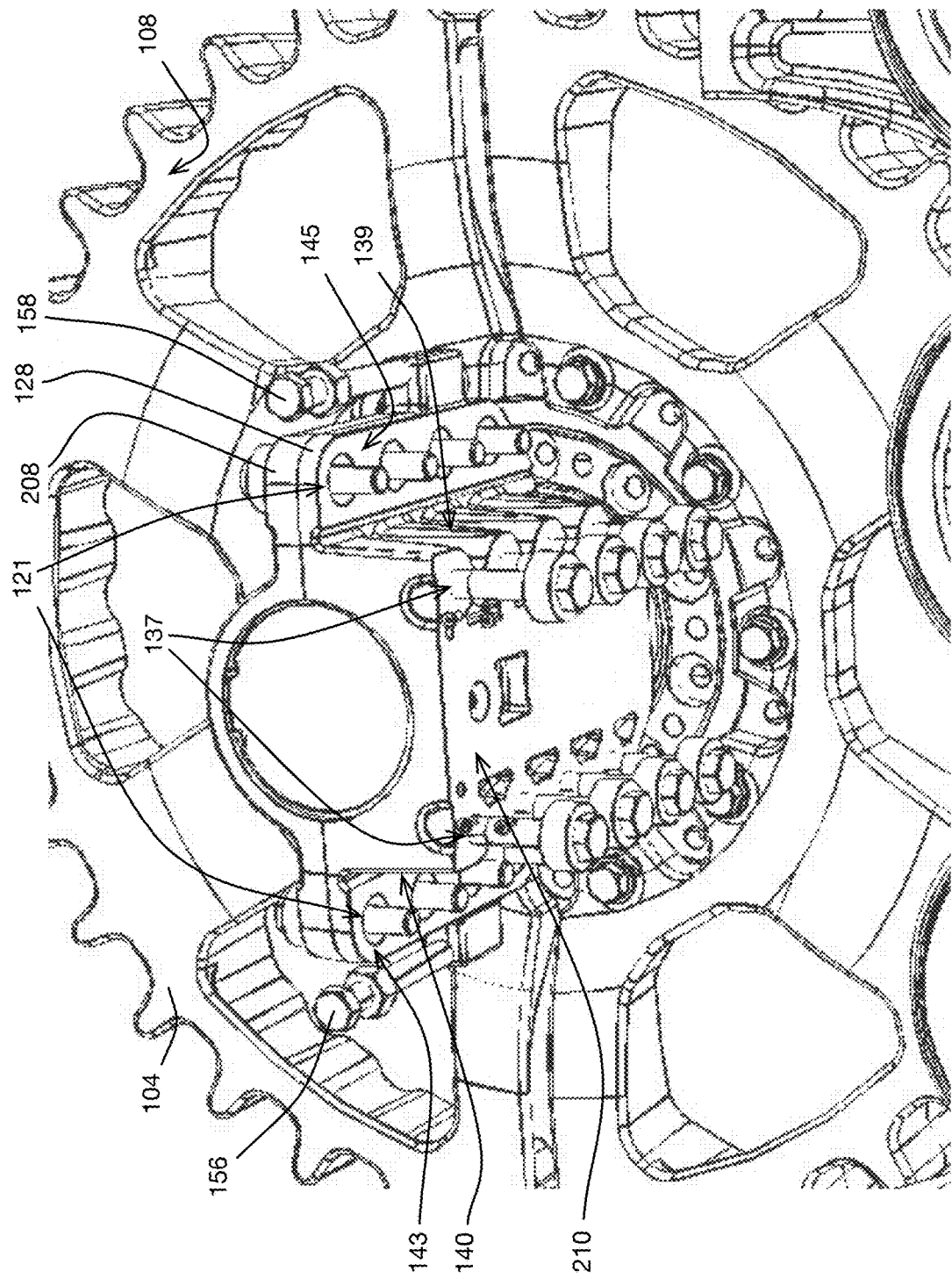
FIG. 10 is a different close-up perspective view of the central part of the track system of FIG. 8 on the outboard-facing side, with some parts of the track system being removed to better show some parts of the track system.

Reference is now made to FIGS. 8 to 10, which show a track system 200, which is a different implementation of the track system 100. Elements of the track system 200 that are similar to those of the track system 100 have been labeled with the same reference numerals and will not be described herein in more detail.

As shown in FIG. 9, the frame 202 of the track system 200 is different than the frame 112 of the track system 100 in that it does not have the cavity 141 defined through the upwardly-facing surface 204 of the recess 206. As shown in FIG. 10, the sub-frame 208 of the track system 200 is different than the sub-frame 124 of the track system 100 in that the sub-frame 208 lacks the pivot member 144 of the sub-frame 124.

Accordingly, when the sub-frame 208 is received in the recess 206, the downwardly-facing surface 210 of the sub-frame 208 is received on the upwardly-facing surface 204 of the recess 206 without defining a vertically extending pivot axis 148 the position of which would be fixed relative to the frame 112.

Instead, when the bolts 125 of the track system 200 are disengaged, for example by being loosened, the position of the frame 202 relative to the sub-frame 208 can be adjusted by pivoting the frame 202 relative to the sub-frame 208 and/or translationally moving (in longitudinal and/or transverse directions) the frame 202 relative to the sub-frame 208, manually and/or using the adjustment bolts 156, 158.

In this implementation, the adjustment bolts 156, 158 could be omitted in which case the pivoting and/or translational adjustments to the position of the frame 202 relative to the sub-frame 208 could be done manually after the track system 200 is mounted onto a vehicle and is lifted off terrain, for example by lifting a corresponding part of the vehicle off terrain, and after the bolts 125 are loosened.

In this implementation, when the bolts 125 are loosened, the range of pivoting adjustments and/or longitudinal transverse adjustments to the position of the frame 202 relative to the sub-frame 208 are limited by the sidewalls of the recess 206 engaging the sidewalls of the sub-frame 208 after a given amount of pivoting and/or longitudinal transverse movement, and the range of transverse translational adjustments is limited by the size of the larger ones 121, 135 of the apertures 121, 123, 135, 137 the sidewalls of which engage one or more of the bolts 125 after a given amount of transverse translational movement of the frame 202 and thereby prevent further transverse translational movement.

It is contemplated that the recess 206 and/or the larger apertures 121, 135 could be structured different such that a different combination of the sidewalls of the recess 206 and/or the sidewalls of the apertures 121, 135 could limit the pivoting and/or longitudinal and/or transverse movement ranges of the frame 202 relative to the sub-frame 208.

Once the frame 202 has been pivoted and/or translationally moved relative to the sub-frame 208 to obtain a desired alignment between the frame 202 and the sub-frame 208, the bolts 128 of the track system 200 are re-tightened (or, re-engaged) to secure the frame 202 in its new position. In this way, the toe-in-toe-out position of the frame 202 and/or the lateral position of the frame 202 relative to the sub-frame 208 can be adjusted and set.

Figure 11:
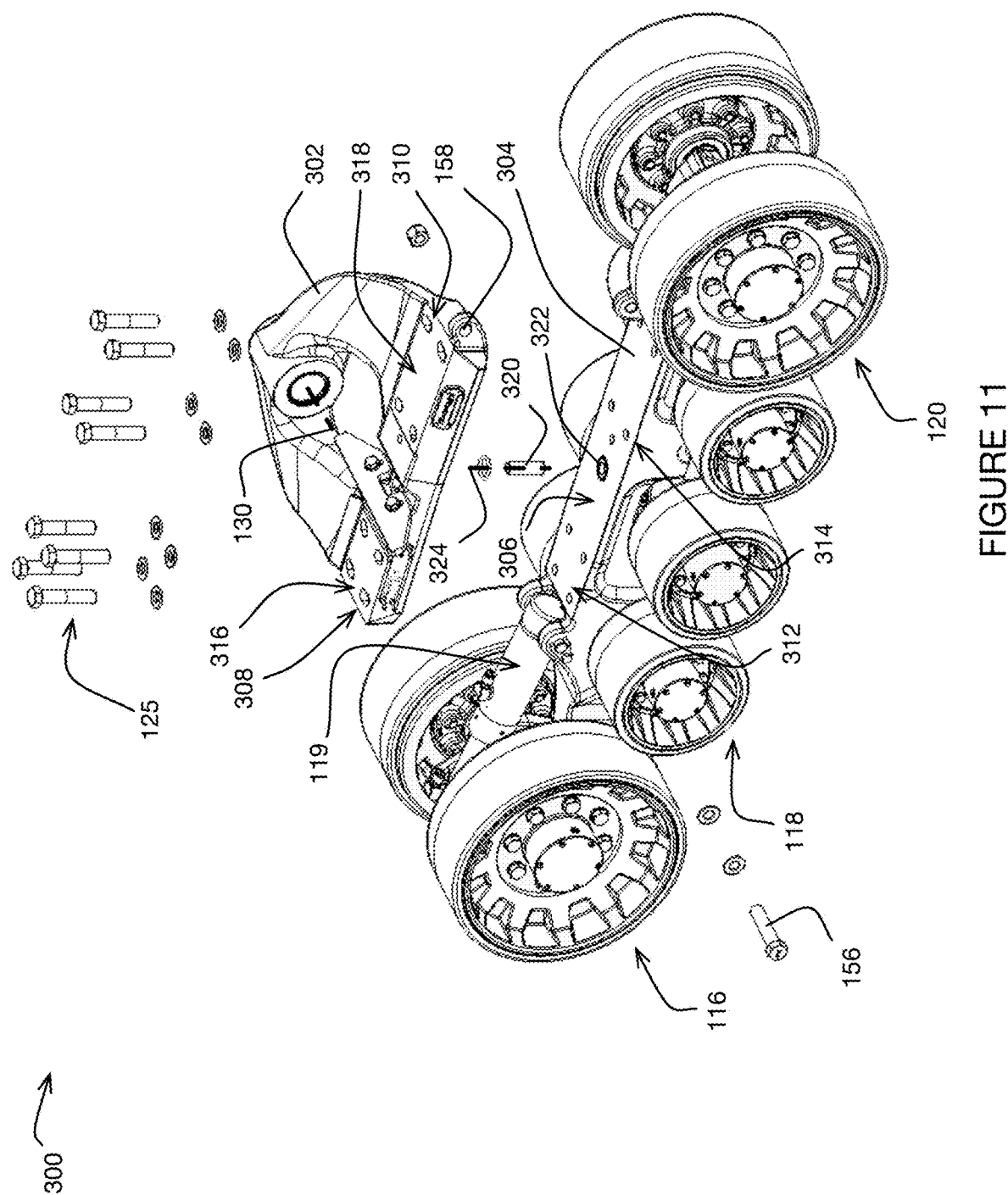
FIG. 11 is an exploded perspective view of yet another implementation of the track system of FIG. 1.
Figure 12:
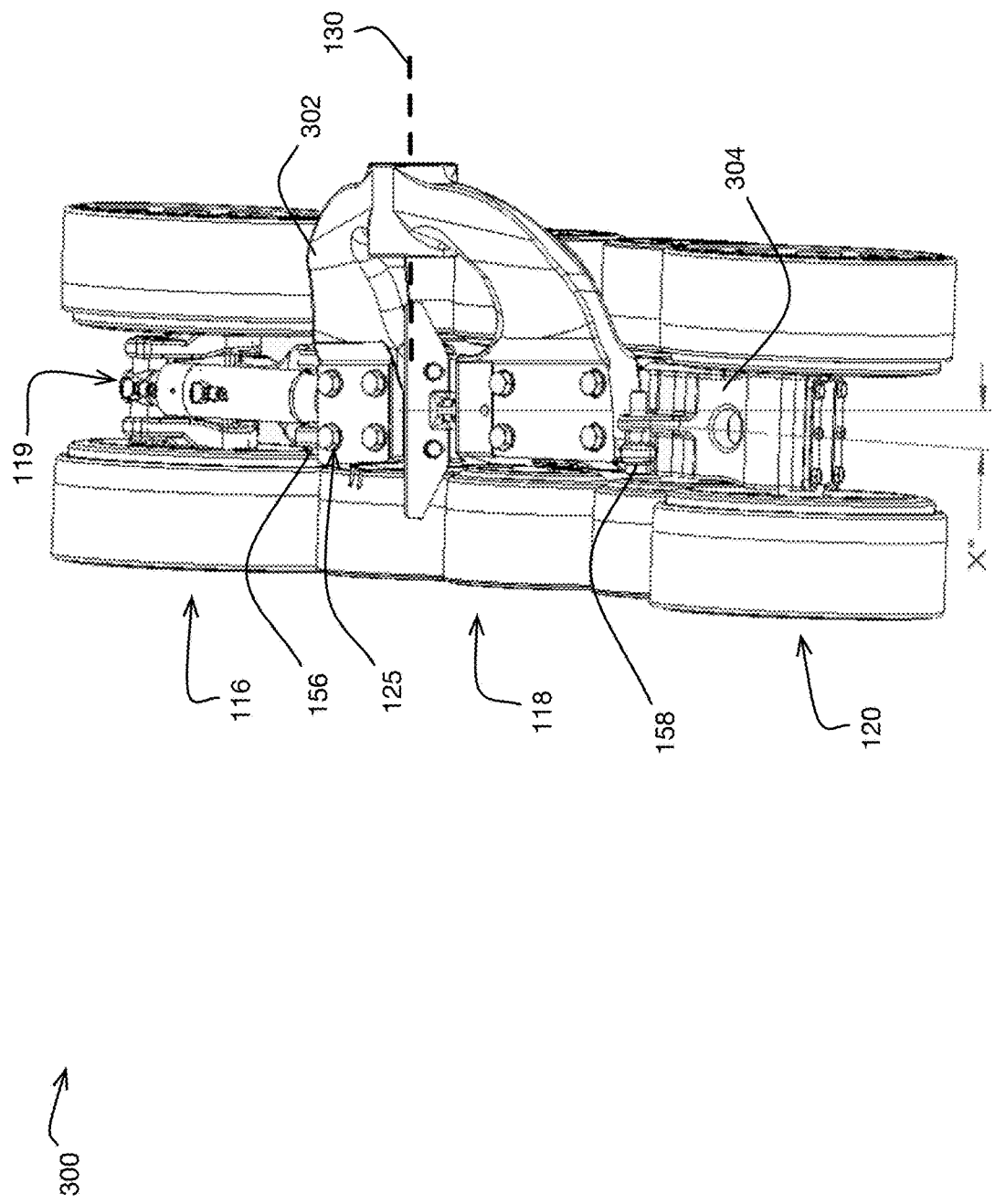
FIG. 12 is a perspective view taken from a rear, top, left side of the track system of FIG. 11, with a frame of the track system being in a different toe-in-toe-out position.

Reference is now made to FIGS. 11 and 12, which show a track system 300, which is yet another different non-limiting implementation of the track system 100. Elements of the track system 300 that are similar to those of the track system 100 have been labeled with the same reference numerals and will not be described herein in more detail.

The primary wheel 104 (not shown in FIGS. 11 and 12, to maintain clarity) of the track system 300 is rotationally supported by the sub-frame 302 of the track system 300 to rotate about the rotation axis 130, similar to the track system 100. Similar to the track system 100, the sub-frame 302 is in turn supported by the frame 304 of the track system 300. Also similar to the track system 100, an endless track 122 (not shown, to maintain clarity) is supported around the primary wheel 104, the leading idler wheels 116, the mid-rollers 118, and the trailing idler wheels 120 and is in driving engagement with the primary wheel 104 to be driven thereby.

One difference between the track system 300 and the track system 100 is that the frame 304 of the track system 300 does not define a recess that receives the sub-frame 302 therein. The sub-frame 302 of the track system 300 is received on a planar upwardly-facing surface 306 of the frame 304 and the sub-frame 302 is bolted to the frame 304. The bolts 125 of the track system 300 are received through corresponding ones of elongated apertures 308, 310 defined through the sub-frame 302, and in corresponding ones of threaded apertures 312, 314 defined in the frame 304. In this implementation, the head of each of the bolts 125 is positioned on a corresponding one of two upwardly-facing surfaces 316, 318 of the sub-frame 302.

Similar to the track system 100, the elongated apertures 308, 310 are dimensioned to allow the frame 304 to pivot relative to the sub-frame 302 and also define the pivot range of the frame 304 relative to the sub-frame 302. The frame 304 is thus pivotable relative to the sub-frame 302 from a neutral position of the frame 304 to a plurality of different positions when the bolts 125 are loosened or removed, such that the frame 304 could then be re-secured to the sub-frame 302 in any one of the different positions by re-tightening the bolts 125. An example of a different position of the frame 304 relative to the sub-frame 302 is shown in FIG. 12.

Similar to the track system 100, the track system 300 includes a pivot pin 320 that is positioned between the sub-frame 302 and the frame 304. The pivot pin 320 is received in an aperture 322 defined in the frame 304 and a corresponding aperture (not shown) defined in the sub-frame 302. In this implementation, the corresponding aperture defined in the sub-frame 302 is a mirror image of the aperture 322, and is therefore not shown. In this implementation, the pivot pin 320 is cast from metal and is a piece separate from the sub-frame 302 and the frame 304. The pivot pin 320 defines the pivot axis 324 of the frame 304 and maintains the pivot range of the frame 304 centered about the pivot axis 324 when the position of the frame 304 relative to the sub-frame 302 is being adjusted as described herein above.

The various components of the non-limiting implementations of the track systems described herein above are made of conventional materials (e.g., for structural components, metals and metal alloys in most cases, such as steel; for the endless track 122, an elastomeric material, such as rubber) via conventional manufacturing processes (e.g. casting, molding, etc.).

The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described implementations of the present technology may become apparent to those skilled in the art. The foregoing description is intended to be exemplary rather than limiting.

The invention claimed is:

1. A track system for attachment to a vehicle, the track system comprising:
a primary wheel structured to be rotationally attachable to the vehicle, the primary wheel having an inboard-facing side and an outboard-facing side opposite the inboard-facing side, the inboard-facing side facing toward the vehicle when the primary wheel is rotationally attached to the vehicle;
a frame rotationally supporting a plurality of secondary wheels, the frame defining a recess therein, the recess having a rearwardly-facing surface, a forwardly-facing surface facing the rearwardly-facing surface, and an upwardly-facing surface intermediate the rearwardly-facing surface and the forwardly-facing surface;
a sub-frame received in the recess of the frame, the sub-frame having a downwardly-facing surface that is supported on the upwardly-facing surface of the frame, the sub-frame and the rearwardly-facing surface of the frame defining a first gap therebetween, the sub-frame and the forwardly-facing surface of the frame defining a second gap therebetween, the sub-frame rotationally supporting the primary wheel, the primary wheel and the plurality of secondary wheels supporting an endless track around the primary wheel and the plurality of secondary wheels; and
a fastener securing the frame to the sub-frame in a neutral position, the fastener being disengageable, the first and second gaps being dimensioned to allow the frame to pivot and translate relative to the sub-frame from the neutral position to a plurality of different positions when the fastener is disengaged, the fastener being re-engageable to secure the frame to the sub-frame in any one of the plurality of different positions.

2. The track system of claim 1, wherein the primary wheel is in driving engagement with the endless track.

3. The track system of claim 1, wherein:
the downwardly-facing surface of the sub-frame is planar;
the upwardly-facing surface of the frame is planar; and
the downwardly-facing surface of the sub-frame is received on the upwardly-facing surface of the frame when the frame is secured to the sub-frame in any one of the plurality of different adjustment positions.

4. The track system of claim 1, wherein:
the downwardly-facing surface of the frame is planar;
the upwardly-facing surface of the frame is planar; and
wherein when the primary wheel is rotationally attached to the vehicle and the vehicle and the track system are stationary on planar horizontal terrain and the track system thereby bears at least part of the vehicle's weight, the downwardly-facing surface of the sub-frame and the upwardly-facing surface of the frame are horizontal.

5. The track system of claim 1, wherein the recess is defined in a top side of the frame.

6. The track system of claim 1, further comprising a pivot member extending in a vertical direction between the sub-frame and the frame and defining a pivot axis of the frame relative to the sub-frame, the pivot axis extending in the vertical direction.

7. The track system of claim 6, wherein the pivot range has a magnitude that is between 0.5 degrees and ten degrees about the pivot axis.

8. The track system of claim 6, wherein the pivot range of the frame is symmetric about the neutral position.

9. The track system of claim 6, wherein the fastener is received in a sub-frame aperture defined in the sub-frame and in a frame aperture defined in the frame, at least one of the sub-frame and frame apertures being larger than the other one of the sub-frame and frame apertures and being dimensioned to define the pivot range of the frame when the fastener is disengaged and remains received in the sub-frame and frame apertures.

10. The track system of claim 1, wherein the fastener is received in a sub-frame aperture defined in the sub-frame and in a frame aperture defined in the frame, and one of the sub-frame and frame apertures is larger than the other one of the sub-frame and frame apertures.

11. The track system of claim 10, wherein the sub-frame aperture passes through the sub-frame, the frame aperture terminates in the frame and is threaded, the sub-frame aperture is larger than the frame aperture, the fastener includes a bolt, and the bolt is threaded into the frame aperture.

12. The track system of claim 6, wherein the pivot member extends from one of the frame and the sub-frame toward the other one of the frame and the sub-frame, and the other one of the frame and the sub-frame defines a cavity that receives a pivot pin therein.

13. The track system of claim 6, further comprising a plurality of fasteners, the fastener being one of the plurality of fasteners, the plurality of fasteners attaching the frame to the sub-frame to prevent pivoting of the frame relative to the sub-frame about the pivot axis, the plurality of fasteners being disengageable, the frame being pivotable relative to the sub-frame about the pivot axis when the plurality of fasteners is disengaged.

14. The track system of claim 13, wherein:
the primary wheel is rotatable relative to the sub-frame about a rotation axis that extends in a transverse direction when the primary wheel is rotationally attached to the vehicle and the vehicle and the track system are stationary on planar horizontal terrain;
a first number of fasteners of the plurality of fasteners is positioned forward of the rotation axis; and
a second number of fasteners of the plurality of fasteners is positioned rearward of the rotation axis.

15. The track system of claim 14, wherein each fastener of the plurality of fasteners extends vertically in the frame and the sub-frame when the primary wheel is rotationally attached to the vehicle and the vehicle and the track system are stationary on planar horizontal terrain.

16. The track system of claim 13, further comprising an adjustment assembly operatively engaging the frame and the sub-frame, the adjustment assembly including a threaded member, the threaded member being rotatable relative to the frame and the sub-frame to thereby pivot the frame relative to the sub-frame about the pivot axis when the plurality of fasteners is disengaged.

17. The track system of claim 16, wherein the threaded member is a first threaded member, the first member being positioned forward of the pivot axis, and the adjustment assembly includes a second threaded member positioned rearward of the pivot axis, the second threaded member being rotatable relative to the frame and the sub-frame to thereby pivot the frame relative to the sub-frame about the pivot axis when the plurality of fasteners is disengaged.

18. The track system of claim 1, wherein when the primary wheel is rotationally attached to the vehicle and the vehicle and the track system are stationary on planar horizontal terrain and the track system thereby bears at least part of the vehicle's weight, the pivot axis is vertical.

19. The track system of claim 1, wherein the sub-frame is positioned on the outboard-facing side of the primary wheel.

\* \* \* \* \*